(12) United States Patent
Jung et al.

(10) Patent No.: US 8,368,828 B2
(45) Date of Patent: Feb. 5, 2013

(54) LIQUID CRYSTAL DISPLAY DEVICE AND METHOD OF MANUFACTURING THE SAME

(75) Inventors: Mee-hye Jung, Suwon-si (KR); Dong-gyu Kim, Yongin-si (KR); Seung-soo Baek, Seoul (KR); Kwang-chul Jung, Seongnam-si (KR); Sei-hyoung Jo, Seoul (KR); Hye-seok Na, Seoul (KR)

(73) Assignee: Samsung Display Co., Ltd. (KR)

( * ) Notice: Subject to any disclaimer, the term of this patent is extended or adjusted under 35 U.S.C. 154(b) by 405 days.

(21) Appl. No.: 12/775,833

(22) Filed: May 7, 2010

(65) Prior Publication Data

US 2010/0328279 A1 Dec. 30, 2010

(30) Foreign Application Priority Data

Jun. 29, 2009 (KR) .................. 10-2009-0058319

(51) Int. Cl.
*G02F 1/1343* (2006.01)
(52) U.S. Cl. ............ 349/38; 349/39; 349/129; 349/141; 349/142
(58) Field of Classification Search .................. 349/129, 349/141–142
See application file for complete search history.

(56) References Cited

U.S. PATENT DOCUMENTS 8,259,053 B2 * 9/2012 Shin ................................ 345/95

* cited by examiner

*Primary Examiner* — Phu Vu
(74) *Attorney, Agent, or Firm* — Cantor Colburn LLP

(57) ABSTRACT

A liquid crystal display device includes; a plurality of data lines disposed on a substrate, a plurality of gate lines disposed substantially perpendicular to the data lines, wherein the data lines and the gate lines together surround a plurality of pixel regions, a plurality of power supplying lines disposed substantially parallel to the data lines, a plurality of pixel electrode pairs, wherein each of the pixel electrode pairs includes a first and a second pixel electrode respectively disposed in each pixel region, and a pixel driving circuit including at least one transistor and a plurality of storage capacitors in each pixel region, wherein the pixel electrode pairs have portions where the pixel electrode pairs and at least one of the plurality of data lines and the plurality of power supplying lines are vertically aligned with each other, and the storage capacitors are disposed at the vertically aligned portions.

14 Claims, 8 Drawing Sheets

LIQUID CRYSTAL DISPLAY DEVICE AND METHOD OF MANUFACTURING THE SAME

This application claims priority to Korean Patent Application No. 10-2009-0058319, filed on Jun. 29, 2009, and all the benefits accruing therefrom under 35 U.S.C. §119, the contents of which in their entirety are herein incorporated by reference.

BACKGROUND OF THE INVENTION

1. Field of the Invention

The present invention relates to a liquid crystal display ("LCD") device and a method of manufacturing the same, and more particularly, to an LCD device that has a reduced difference between the amount of electric charge accumulated in a storage capacitor before and after polarity reversal.

2. Description of the Related Art

In general, a vertical alignment liquid crystal display ("LCD") device includes a pixel electrode for controlling the motion of liquid crystal molecules in a horizontal direction, wherein the pixel electrode is disposed on a rear substrate. In addition, power supplying lines along with data lines and gate lines for driving individual pixels of the LCD are typically disposed on the rear substrate.

In the field of LCD devices, attempts have been made to increase an aperture ratio of pixels thereof for the purpose of maximizing a light-transmitting area per unit area of the LCD, increase light use efficiency, and prevent cross-talk or an after image through fast and stable pixel switching. In order to increase an aperture ratio, it would be desirable to reduce a light blocking area of individual pixels. In order to increase light use efficiency, a low light absorption material may be selected, the number of stacked layers may be reduced, and a pixel voltage may be increased. In order to ensure fast and stable pixel switching, image information of a previous frame may be completely removed during a frame update, and a liquid crystal control voltage corresponding to a given gray level gradation may be applied to a liquid crystal layer.

BRIEF SUMMARY OF THE INVENTION

The present invention provides a liquid crystal display ("LCD") device that can display high-quality images, and a method of manufacturing LCD device.

The present invention also provides an LCD device that can increase an aperture ratio of a pixel and improve characteristics of a storage capacitor, and a method of manufacturing the LCD device.

According to an aspect of the present invention, an LCD device includes; a plurality of data lines disposed on a substrate, a plurality of gate lines disposed substantially perpendicular to the plurality of data lines, wherein the plurality of data lines and the plurality of gate lines together surround a plurality of pixel regions, a plurality of power supplying lines disposed substantially parallel to the plurality of data lines, a plurality of pixel electrode pairs, wherein each of the pixel electrode pairs includes a first pixel electrode and a second pixel electrode respectively disposed in each of the plurality of pixel regions, and a pixel driving circuit including at least one transistor and a plurality of storage capacitors in each of the plurality of pixel regions, wherein the plurality of pixel electrode pairs have portions where the pixel electrode pairs and at least one of the plurality of data lines and the plurality of power supplying lines are vertically aligned with each other, and the plurality of storage capacitors are disposed at the vertically aligned portions.

In one exemplary embodiment, the plurality of power supplying lines may include a first power supplying line and a second power supplying line, both the first power supplying line and the second power supplying line extending substantially parallel to the plurality of data lines, wherein the first and second pixel electrodes intersect the first and second power supplying lines, wherein the plurality of storage capacitors are formed between the first and second pixel electrodes and the first and second power supplying lines.

In one exemplary embodiment, the first and second pixel electrodes and the first and second power supplying lines may include extensions facing each other at the intersections between the first and second pixel electrodes and the first and second power supplying lines.

In one exemplary embodiment, the first and second pixel electrodes may be substantially symmetrical with one another about the first and second power supplying lines.

In one exemplary embodiment, the first and second pixel electrodes are engaged with each other in an interdigitated fashion.

In one exemplary embodiment, one of the power supplying lines and one of the data lines may be disposed at opposing sides of each of the plurality of pixel regions.

In one exemplary embodiment, the first and second pixel electrodes may have extensions that are vertically aligned with at least one of the power supplying line and the data line.

In one exemplary embodiment, at least a portion of the plurality of storage capacitors may be formed at regions where the first and second pixel electrodes are vertically aligned with the plurality of power supplying lines, and the remaining storage capacitors may be formed at regions where the first and second pixel electrodes are vertically aligned with the data lines.

In one exemplary embodiment, the power supplying lines and the data lines may included the same material as a drain and a source of the transistor.

In one exemplary embodiment, the transistor may have a bottom gate structure in which a gate is disposed under a channel layer, wherein a dielectric layer included in each of the plurality of storage capacitors includes a dielectric material formed on the transistor.

In one exemplary embodiment, a planarization layer including the dielectric material may be disposed on the transistor, and the dielectric layer may be integrally formed as a single, solitary and indivisible unit with the planarization layer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
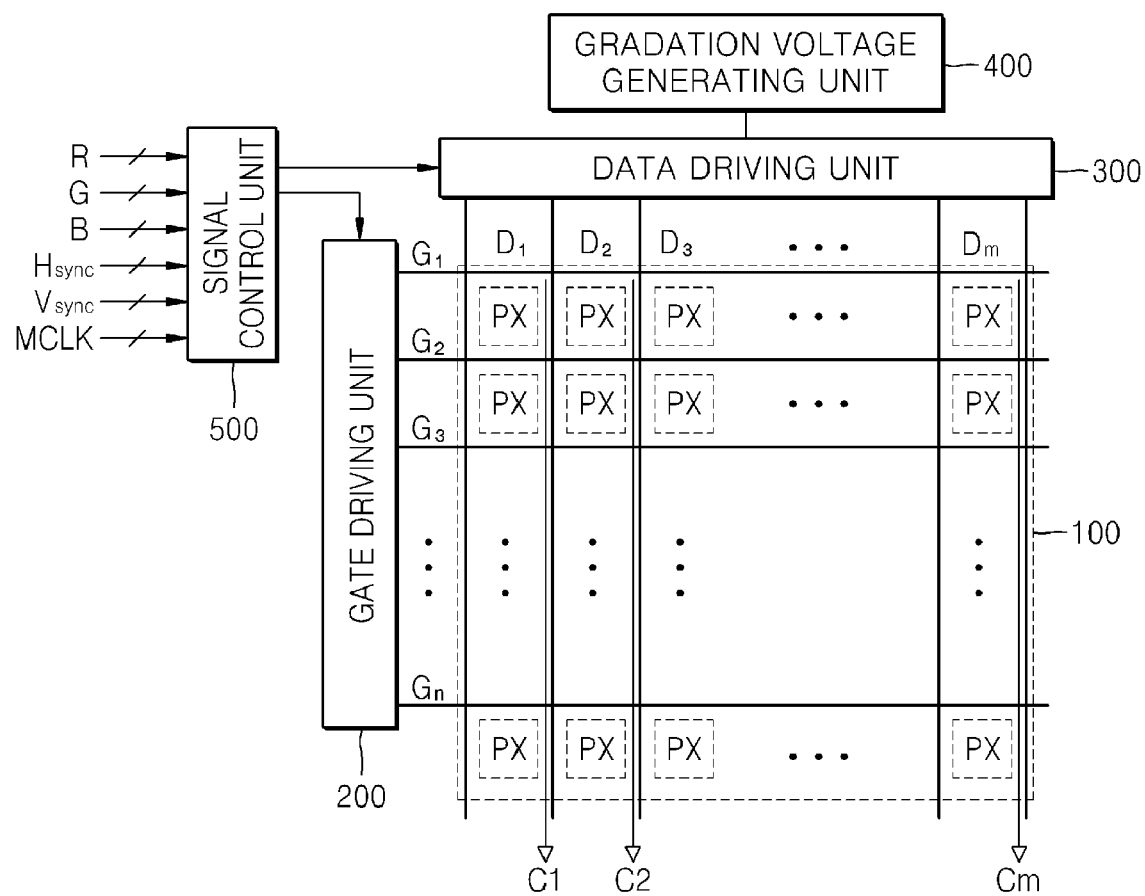
FIG. 1 is a block diagram of an exemplary embodiment of a liquid crystal display ("LCD") device according to the present invention.

The present invention will now be described more fully with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

An exemplary embodiment of a vertical alignment liquid crystal display ("LCD") device having one gate line and one data line (1G1D) structure will be explained below. The vertical alignment LCD device is driven such that one pixel is driven by one gate line and one data line.

Figure 2:
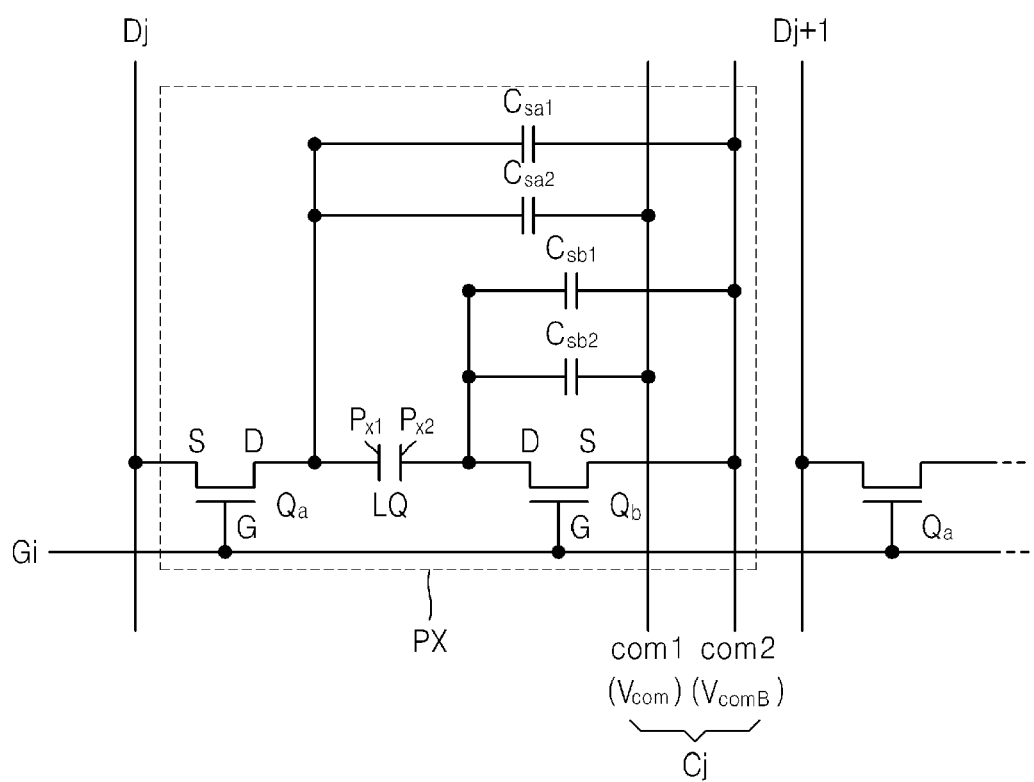
FIG. 2 is a circuit diagram illustrating an equivalent circuit of an exemplary embodiment of a pixel of the exemplary embodiment of an LCD device of FIG. 1.

FIG. 1 is a block diagram of an exemplary embodiment of an LCD device according to the present invention. FIG. 2 is a circuit diagram illustrating an equivalent circuit of an exemplary embodiment of a pixel of the LCD device of FIG. 1.

Referring to FIG. 1, the LCD device includes an image display region 100 including a plurality of data lines $D_1$ through $D_m$ (wherein m is a natural number) arranged in parallel in a first direction, a plurality of gate lines (also referred to as scan lines) $G_1$ through $G_n$ (wherein n is a natural number) disposed in parallel in a second direction substantially perpendicular to the first direction, a plurality of pixels (PX) disposed in regions surrounded by the data lines $D_1$ through $D_m$ and the gate lines $G_1$ through $G_n$, and power supplying lines $C_1$ through $C_m$ disposed substantially parallel to the data lines $D_1$ through $D_m$. The data lines $D_1$ through $D_m$ of the image display region 100 are connected to a data driving unit 300, and the gate lines $G_1$ through $G_n$ are connected to a gate driving unit 200. Exemplary embodiments include configurations wherein one or more of the power supplying lines $C_1$ through $C_m$ may be disposed within each pixel. As illustrated in FIG. 1, only a single power supplying line of the power supplying lines $C_1$ through $C_m$ is disposed within each individual pixel. The power supplying lines $C_1$ through $C_m$ are commonly connected to a plurality of pixels along a scanning direction of the LCD device, that is the power supplying lines $C_1$ through $C_m$ are disposed in a direction substantially parallel to the plurality of data lines $D_1$ through $D_m$. In FIG. 1, one power supplying line is symbolically disposed within each pixel.

In general, red (R), green (G), and blue (B) signals, vertical and horizontal synchronization signals $V_{sync}$ and $H_{sync}$, and a main clock signal MCLK are externally applied to a signal control unit 500. The signal control unit 500 provides a data signal and a scan signal to the data driving unit 300 and the gate driving unit 200, respectively. A gradation voltage generating unit 400 for generating a gradation voltage (also referred to as a grayscale voltage) in synchronization with the scan signal is connected to the data driving unit 300.

The power supplying lines $C_1$ through $C_m$ may be patterned simultaneously with data lines and source and drain electrodes of transistors within the plurality of pixels PX in order to isolate a storage capacitor from a metal-insulator-semiconductor ("MIS") including a channel material (or a semiconductor material) of a switching element disposed on each pixel, which will be described later in additional detail.

FIG. 2 is an illustration of an equivalent circuit diagram of an exemplary embodiment of a pixel PX formed at an intersection between a $j^{th}$ data line Dj (wherein j is a natural number between 1 and m) of the plurality of data lines $D_1$ through $D_m$ and an $i^{th}$ gate line Gi (wherein i is a natural number between 1 and n) of the plurality of gate lines $G_1$ through $G_n$.

A source electrode S and a gate electrode G of a first transistor $Q_a$ are respectively connected to the $j^{th}$ data line Dj and the $i^{th}$ gate line Gi, and a drain electrode D of the first transistor $Q_a$ is connected to a first pixel electrode Px1 and a first node of a first storage capacitor $C_{sa1}$ and a first node of a second storage capacitor $C_{sa2}$.

A second pixel electrode Px2 is connected to a drain D (the figure is marked incorrectly, it's marked S) of a second transistor $Q_b$ and a first node of a third storage capacitor $C_{sb1}$ and a first node of a fourth storage capacitor $C_{sb2}$.

Second nodes of the first through fourth storage capacitors $C_{sa1}$, $C_{sa2}$, $C_{sb1}$, and $C_{sb2}$ and a source S of the second transistor $Q_b$ are connected to a $j^{th}$ power supplying line Cj. In the exemplary embodiment illustrated in FIG. 2, the $j^{th}$ power supplying line Cj includes a first power supplying line com1 to which a first power supplying voltage $V_{com}$ is applied and a second power supplying line com2 to which a second power supplying voltage $V_{comB}$ is applied. In one exemplary embodiment, a first and second voltages having opposite phases are applied to the first and second power supplying lines com1 and com2, and the phase of the first and second voltages are switched during a blank time between frames. In an alternative exemplary embodiment, the phase of the first and second voltages are switched after a vertical scanning period, even if a blank time is not included between frames.

The second nodes of the second and fourth capacitors $C_{sa2}$ and $C_{sb2}$ are connected to the first power supplying line com1, and the second nodes of the first and third capacitors $C_{sa1}$ and $C_{sb1}$ are connected to the second power supplying line com2.

The source electrode S of the second transistor $Q_b$ may be selectively connected to the first power supplying line com1 or the second power supplying line com2 depending upon the location of the pixel within the LCD device. In detail, the source electrode S of the second transistor $Q_b$ may be connected to the first power supplying line com1 in pixels corresponding to the $i^{th}$ gate line Gi and the second transistor Qb may be connected to the second power supplying line com2 in pixels corresponding to an $i+1^{th}$ gate line Gi+1. The alternating connection of the source S of the second transistor $Q_b$ will be more easily understood in conjunction with the description of FIG. 3 below. In FIG. 2, LQ denotes a light control unit (also referred to as a light modulating unit) including the first pixel electrode Px1 and the second pixel electrode Px2 and a liquid crystal layer disposed between the first pixel electrode Px1 and the second pixel electrode Px2. The light control unit LQ varies the transmittance of light through the pixel in which it is disposed.

Figure 3:
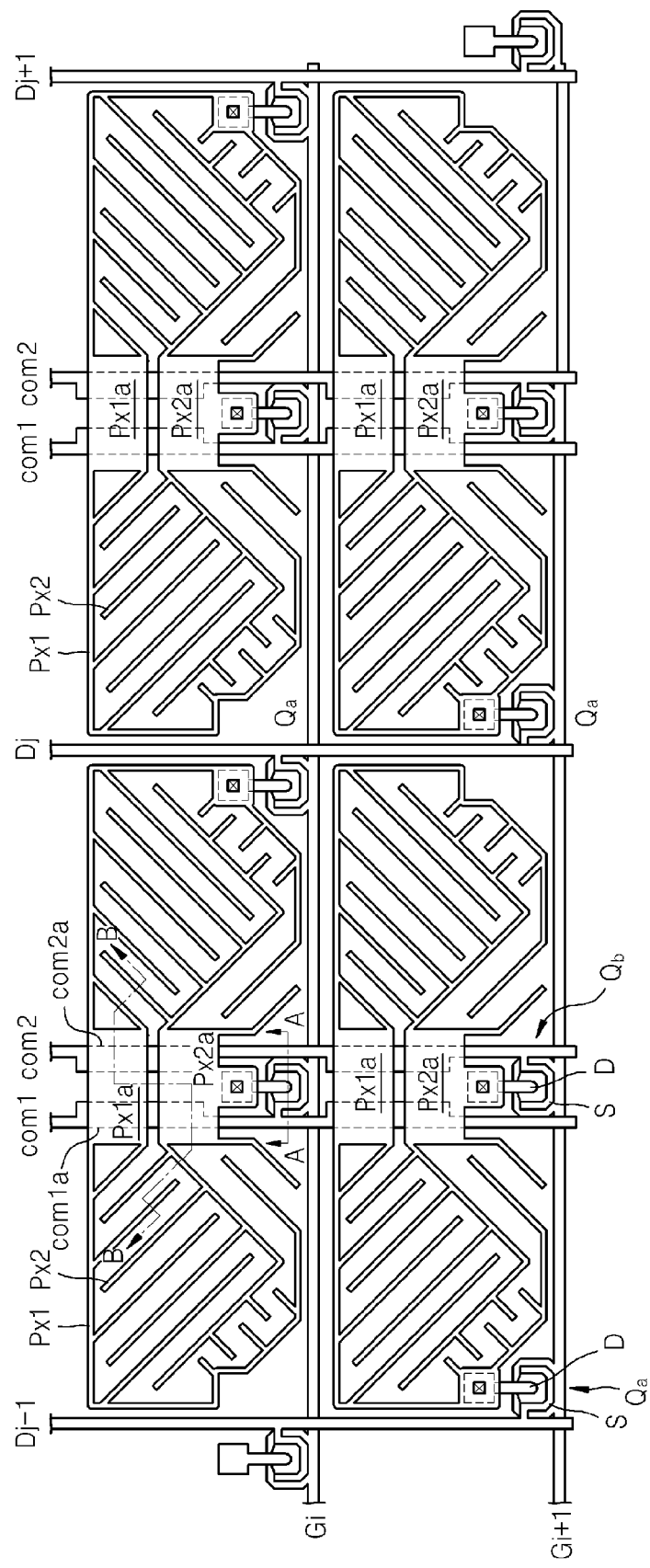
FIG. 3 illustrates a top plan view of four neighboring pixels each having a structure corresponding to the equivalent circuit diagram of FIG. 2.
Figure 4A:
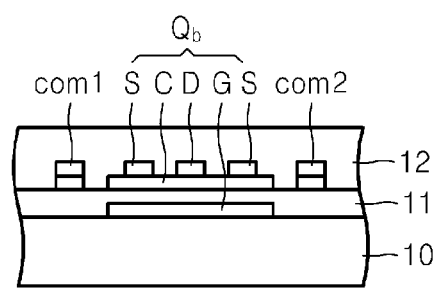
FIG. 4A is a cross-sectional view taken along line A-A of FIG. 3 illustrating an exemplary embodiment of a stacked structure of a transistor.
Figure 4B:
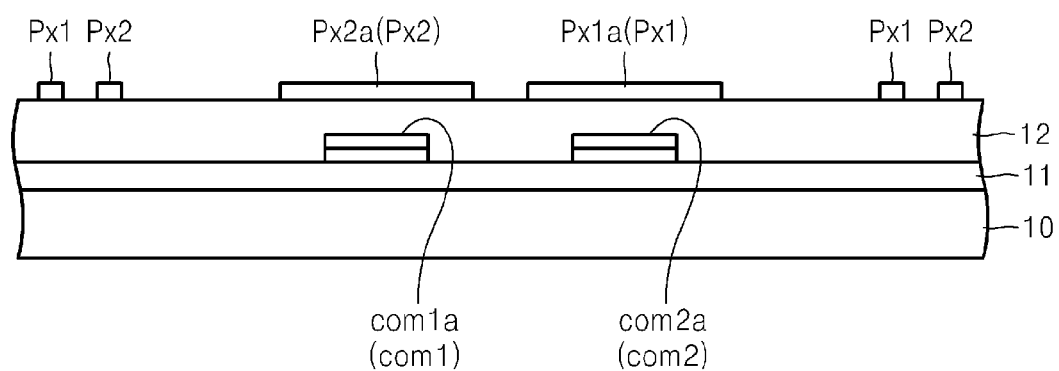
FIG. 4B is a cross-sectional view taken along line B-B of FIG. 3 illustrating a vertical structure of an exemplary embodiment of storage capacitors.

FIG. 3 illustrates a top plan view of four neighbouring pixels each having a structure corresponding to the equivalent circuit of FIG. 2. FIG. 4A is a cross-sectional view taken along line A-A of FIG. 3 illustrating an exemplary embodiment of a stacked structure of the second transistor $Q_b$. FIG. 4B is a cross-sectional view taken along line B-B illustrating an exemplary embodiment of a vertical structure of the storage capacitors $C_{sa1}$, $C_{sa2}$, $C_{sb1}$, and $C_{sb2}$.

A plurality of data lines Dj−1, Dj, and Dj+1 are disposed to extend in a substantially longitudinal direction, that is, a direction corresponding to the sequential scan direction of the LCD device. A plurality of gate lines Gi and Gi+1 are disposed to extend in a horizontal direction substantially perpendicular to the longitudinal direction. A plurality of the first and second power supplying lines com1 and com2 having substantially symmetrical patterns are disposed between the data lines Dj−1 and Dj and between Dj and Dj+1 to extend substantially parallel to the data lines Dj−1, Dj, and Dj+1. That is, one of the first power supplying lines com1 and one of the second power supplying lines com2 are disposed in the middle between two adjacent data lines and the first and second power supplying lines com1 and com2 are spaced part from each other. A plurality of the second transistors $Q_b$ are disposed below the first and second power supplying lines com1 and com2. Each of the first and second transistors $Q_a$ and $Q_b$ includes the drain electrode D, which in the present exemplary embodiment is I-shaped, and the source electrode S, which in the present exemplary embodiment is U-shaped and surrounds a lower portion of the drain D. First and second pixel electrodes Px1 and Px2 are engaged with each other in a comb-like fashion, e.g., they are interdigitated, and are disposed over the first and second power supplying lines com1 and com2. Extensions Px1a and Px2a of the pixel electrodes Px1 and Px2, respectively, are rectangular, and are disposed at regions of the pixel where the first and second power supplying lines com1 and com2 overlap the first and second pixel electrodes Px1 and Px2, respectively in order to form the storage capacitors $C_{sa1}$, $C_{sa2}$, $C_{sb1}$, and $C_{sb2}$. Specifically, the extensions Px1a and Px2a may be formed to increase a capacitance of the storage capacitors $C_{sa1}$, $C_{sa2}$, $C_{sb1}$, and $C_{sb2}$. Extensions com1a and com2a of the power supplying lines com1 and com2 are disposed corresponding to the extensions Px1a and Px2a. In one exemplary embodiment, the extensions com1a and com2a and the extensions Px1a and Px2a are vertically aligned with one another.

Accordingly, the storage capacitors $C_{sa1}$, $C_{sa2}$, $C_{sb1}$, and $C_{sb2}$ are formed using the extensions Px1a and Px2a of the first and second pixel electrodes Px1 and Px2 and the extensions com1a and com2a of the first and second power supplying lines com1 and com2, which overlap the extensions Px1a and Px2a, without using additional electrode elements.

Referring to FIG. 4A, which is a cross-sectional view taken along the line A-A of FIG. 3, the gate G of the second transistor $Q_b$ is disposed on a substrate 10, and an insulating layer 11 (also referred to as a gate insulating layer) formed of $SiN_x$ or other materials with similar characteristics, is disposed on the gate G. A semiconductor channel layer C corresponding to the gate G is disposed on the gate insulating layer 11, and the source electrode S and the drain electrode D of the second transistor $Q_b$ are disposed on the channel layer C. A general ohmic contact layer (not shown) may optionally be disposed between the source electrode S and the drain electrode D and the semiconductor channel layer C. The first and second power supplying lines com1 and com2 are formed at both sides of the channel layer C. A resultant structure is covered by a planarization layer 12 formed of a dielectric material.

Referring to FIG. 4B, which is a cross-sectional view taken along line B-B of FIG. 3, the gate insulating layer 11 is formed on the substrate 10, and the extensions com1a and com2a of the power supplying lines com1 and com2 are disposed over the gate insulating layer 11. The extensions com1a and com2a function as one electrode, also referred to as a node, of the storage capacitors $C_{sa1}$, $C_{sa2}$, $C_{sb1}$, and $C_{sb2}$. The extensions com1a and com2a are covered by the planarization layer 12, and the extensions Px1a and Px2a of the pixel electrodes Px1 and Px2 are disposed on the planarization layer 12 and vertically aligned with the extensions com1a and com2a.

In FIGS. 4A and 4B, the first and second power supplying lines com1 and com2 are two layers formed by patterning the channel layer C from a semiconducting layer (not shown) and patterning a data metal layer (not shown) into the source electrode S, the drain electrode D. The power supplying lines may thereby be formed with a reduced number of masks or a masking procedure may be eliminated.

The storage capacitors $C_{sa1}$, $C_{sa2}$, $C_{sb1}$, and $C_{sb2}$ are disposed beyond the channel layer C, and a dielectric layer of each of the storage capacitors $C_{sa1}$, $C_{sa2}$, $C_{sb1}$, and $C_{sb2}$ is integrally formed with the planarization layer 12 formed of a dielectric material as a single, solitary and indivisible unit, e.g., the planarization layer 12 is a component of the storage capacitors $C_{sa1}$, $C_{sa2}$, $C_{sb1}$, and $C_{sb2}$. That is, portions of the planarization layer 12 function as a dielectric layer of each the storage capacitors $C_{sa1}$, $C_{sa2}$, $C_{sb1}$, and $C_{sb2}$, and the extensions com1a and com2a formed overlapping, e.g., vertically aligned with, the pixel electrodes PX1 and PX2 and the power supplying lines com1 and com2 respectively function as upper and lower electrodes. Accordingly, each of the storage capacitors $C_{sa1}$, $C_{sa2}$, $C_{sb1}$, and $C_{sb2}$ does not have a metal insulator semiconductor ("MIS") structure.

If the storage capacitors $C_{sa1}$, $C_{sa2}$, $C_{sb1}$, and $C_{sb2}$ have an MIS structure, an aperture ratio is increased and the number of masks is reduced generally in a 4-mask process, thereby reducing costs and the number of process steps. However, if the storage capacitor has an MIS structure, there a disparity between the amount of accumulated electric charge when a data signal has a positive polarity and when a data signal has a negative polarity may occur. The difference in accumulated charges changes a kick-back voltage Vkb of a pixel, thereby causing an after image of a previous frame even after the previous frame has been updated.

Figure 5:
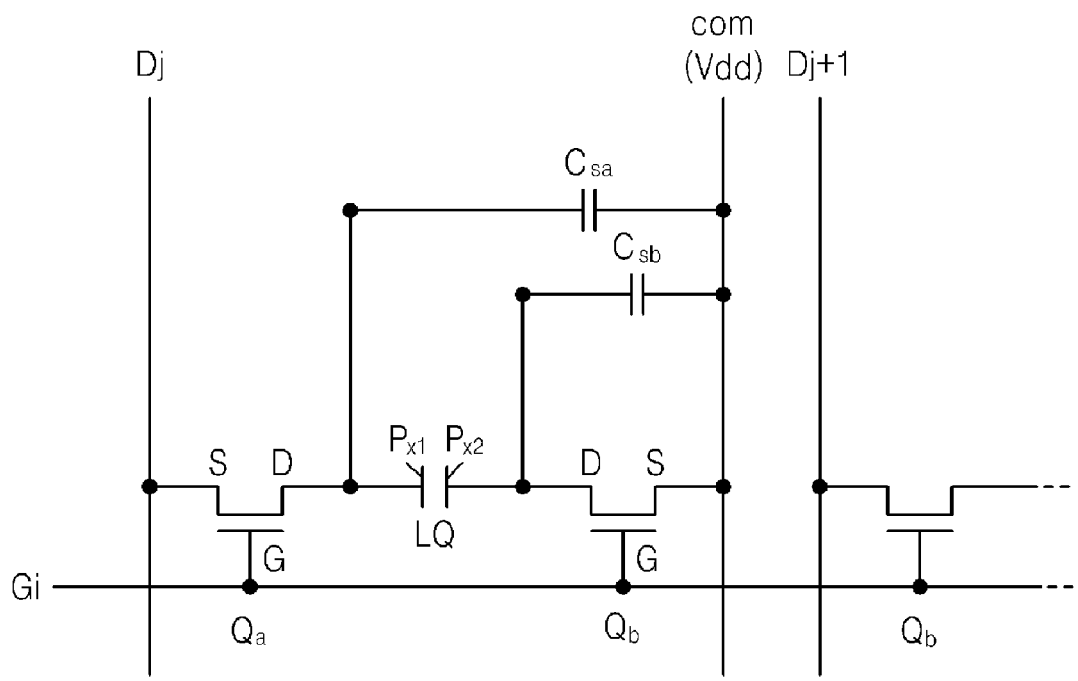
FIG. 5 is a circuit diagram illustrating an equivalent circuit of another exemplary embodiment of a pixel of the LCD device of FIG. 1.

However, in FIGS. 3 through 5, since the extensions PX1a and PX2a are disposed in the middle between the pixel electrodes PX1 and PX2 having symmetrical patterns and the extensions com1a and com2a of the power supplying lines com1 and com2 having symmetrical patterns are disposed under the extensions PX1a and PX2a, adjacent storage capacitors have similar electric charge. Also, since an additional space for realizing the storage capacitors is not necessary, the aperture ratio can be increased. In one exemplary embodiment, the two power supplying lines com1 and com2 may be applied, for example, to a 5-mask process of separately patterning a source, a drain, and a channel layer. In such an exemplary embodiment, a channel layer material, for example, semiconductor silicon, may not be present in regions other than transistor regions, and the MIS structure may be avoided.

An exemplary embodiment of a pixel having a 1G1D structure using one power supplying line will now be explained. Similar to the previous exemplary embodiment, in this exemplary embodiment storage capacitors are formed using extensions formed by overlapping the power supplying line and pixel electrodes, and the power supplying line extends in a scan direction, e.g., a direction substantially parallel to the data lines.

Figure 6:
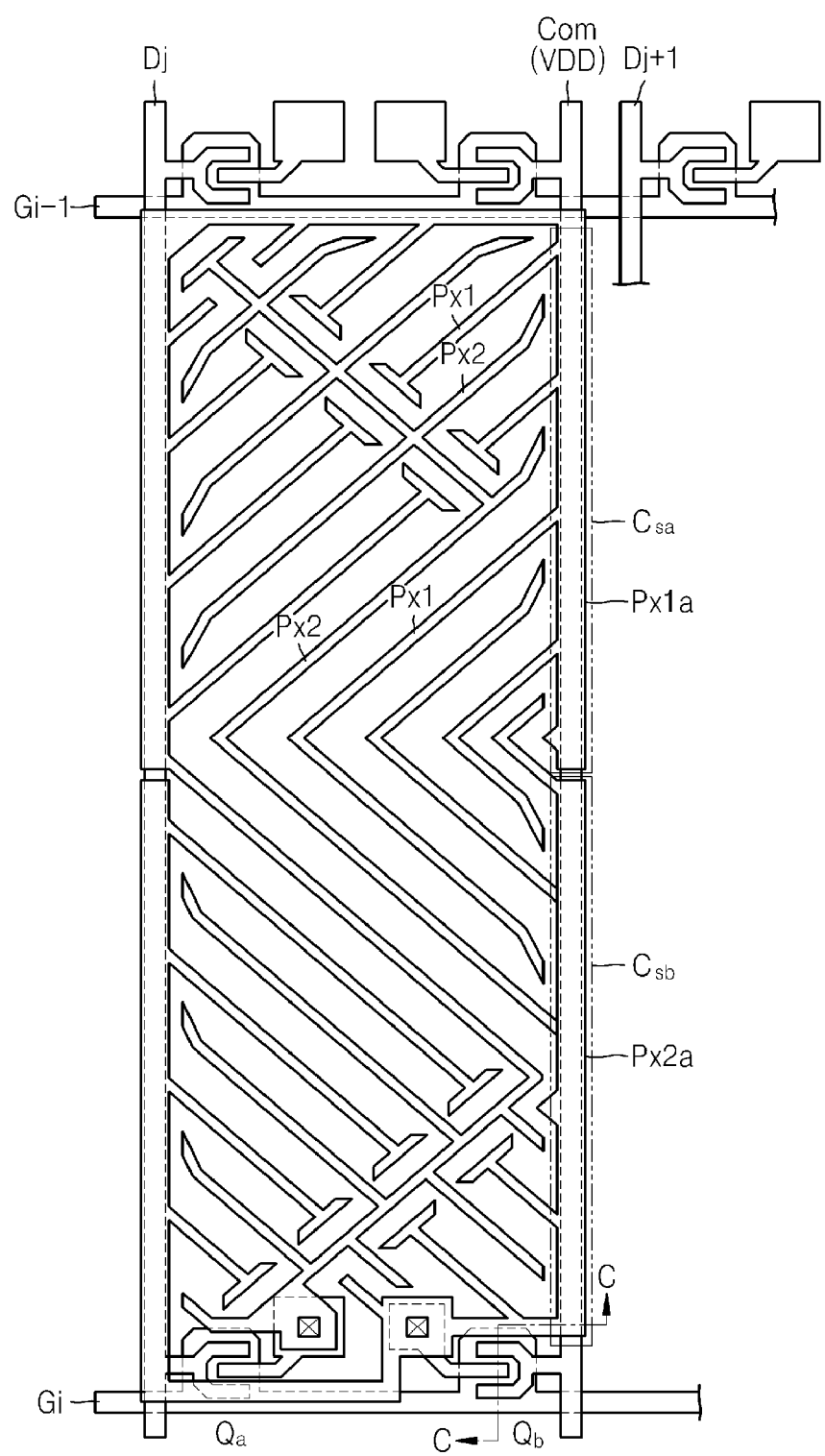
FIG. 6 illustrates a top plan view of the exemplary embodiment of a pixel of FIG. 5.

FIG. 5 is a circuit diagram illustrating an equivalent circuit of another exemplary embodiment of a pixel having a 1G1D structure using one power supplying line com, according to the present invention. FIG. 6 illustrates a top plan view of the pixel of FIG. 5.

Referring to FIG. 5, a gate line Gi is disposed in a direction substantially perpendicular to data lines Dj and Dj+1. A first pixel electrode Px1 is connected to a drain electrode D of a first transistor $Q_a$, a source electrode of the first transistor $Q_a$ is connected to the data line Dj, a drain electrode D of a second transistor $Q_b$ is connected to a second pixel electrode Px2, and a source electrode S of the second transistor $Q_b$ is connected to the power supplying line com, as will be described in more detail later. Gates of the first and second transistors $Q_a$ and $Q_b$ are commonly connected to the gate line Gi. First nodes of first and second storage capacitors $C_{sa}$ and $C_{sb}$ are respectively connected to the drains of the first and second transistors $Q_a$ and $Q_b$, and second nodes of the first and second storage capacitors $C_{sa}$ and $C_{sb}$ are commonly connected to the power supplying line com.

Figure 7:
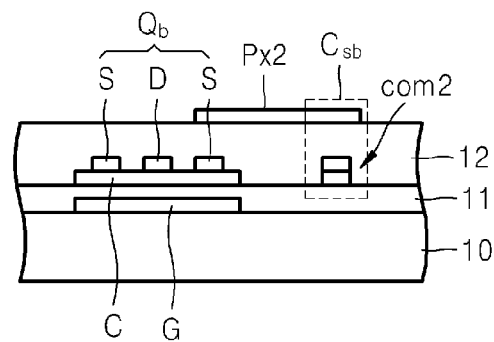
FIG. 7 is a cross-sectional view taken along line C-C of FIG. 6.

Referring to FIG. 6, the first and second pixel electrodes Px1 and Px2 are substantially symmetrical with respect to each other along a horizontal midline while being engaged with each other in a comb fashion, which may also be referred to as an interdigitated fashion. Extensions Px1a and Px2a of the first and second pixel electrodes Px1 and Px2 overlap the power supplying line com extending substantially parallel to the data lines Dj and Dj+1 at a side of a pixel region. Accordingly, the first capacitor $C_{sa}$ is disposed on a portion where the extension Px1a of the first pixel electrode Px1 and the power supplying line com overlap each other, e.g., where they are vertically aligned, and the second storage capacitor $C_{sb}$ is disposed on a portion where the extension Px2a of the second pixel electrode Px2 and the power supplying line corn overlap each other, e.g., where they are vertically aligned. A drain voltage VDD may be applied through the power supplying line corn. FIG. 7 is a cross-sectional view taken along line C-C of FIG. 6. A method of forming the first and second storage capacitors $C_{sa}$ and $C_{sb}$ will be described in more detail with reference to FIG. 7.

Referring to FIG. 7, a gate electrode G of the second transistor $Q_b$ is disposed on a substrate 10, and a gate insulating layer 11, exemplary embodiments of which may be formed of $SiN_x$ or other materials having similar characteristics, is disposed on the gate electrode G. A channel layer C of the second transistor $Q_b$ is disposed on the gate insulating layer 11 and corresponds to the gate G, and a source electrode S and a drain electrode D of the second transistor $Q_b$ are disposed on the channel layer C. A general ohmic contact layer (not shown) may be disposed between the source electrode S and the drain electrode D and the channel layer C. The power supplying line corn is formed at a side (e.g., the right side as illustrated in FIG. 7) of the second transistor $Q_b$. A resultant structure is covered by a planarization layer 12 formed of a dielectric material, and the second pixel electrode Px2 is disposed on the planarization layer 12. The extension Px2a of the second pixel electrode Px2 overlaps, e.g., is vertically aligned with, the power supplying line corn disposed under the extension Px2a. Accordingly, the power supplying line corn functions as one electrode of the storage capacitors $C_{sa}$ and $C_{sb}$, and the first and second pixel electrodes Px1a and Px2a disposed over the power supplying line corn function as another electrode thereof.

Although one power supplying line corn is used and a plurality of pixels form an array in an X-Y matrix in FIGS. 5 through 7, the present invention is not limited thereto.

Figure 8:
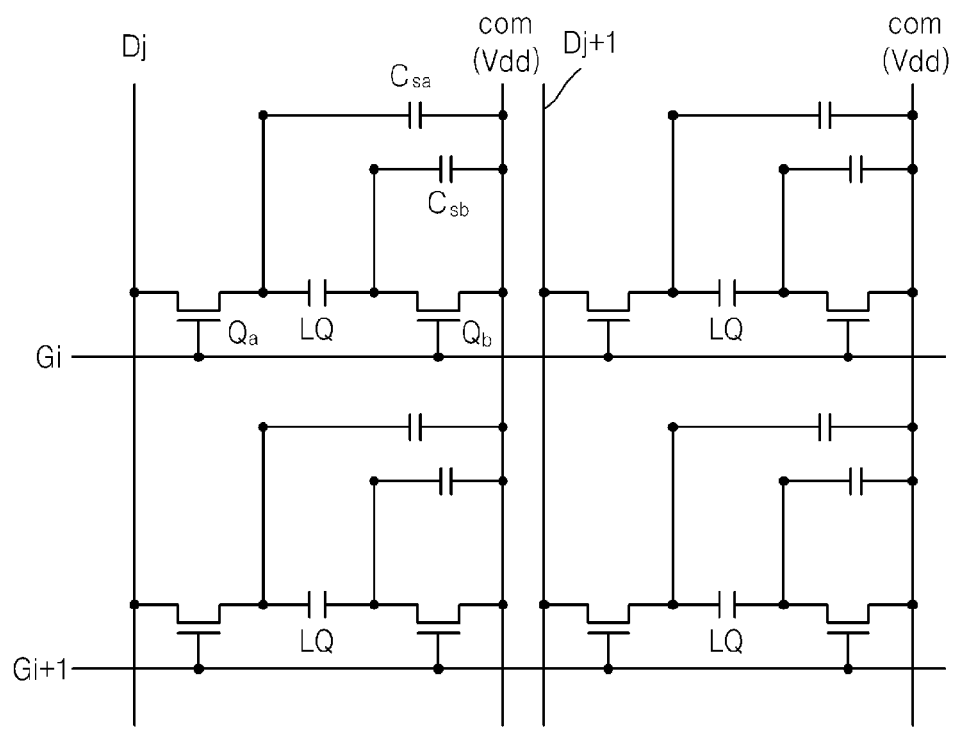
FIG. 8 is a circuit diagram illustrating an equivalent circuit of an exemplary embodiment of a pixel array composed of pixels each having the structure illustrated in FIGS. 5 through 7.
Figure 9:
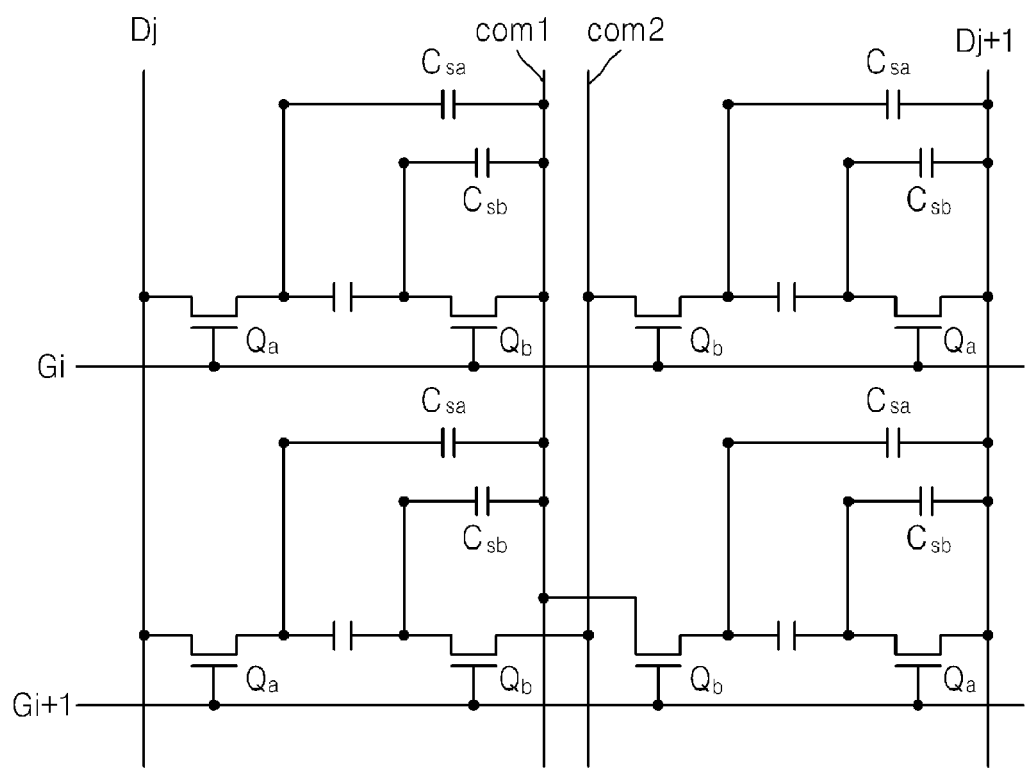
FIG. 9 is a circuit diagram illustrating an equivalent circuit of another embodiment of a pixel array according to the present invention.

FIG. 8 is a circuit diagram illustrating an equivalent circuit of another exemplary embodiment of a pixel array including pixels each having the structure illustrated in FIGS. 5 through 7. FIG. 9 illustrates an equivalent circuit of an exemplary embodiment of a pixel array according to the present invention.

Referring to FIG. 8, a pixel having such a structure as illustrated in FIGS. 5 through 7 may be used, and a detailed description thereof will not be given in order to avoid unnecessary repetition.

Referring to FIG. 9, two neighbouring columns of pixels PX may share two adjacent power supplying lines com1 and com2. In detail, left and right columns of pixels PX are connected between a $j^{th}$ data line Dj and a $j+1^{th}$ data line Dj+1, and the two power supplying lines com1 and com2 are disposed substantially parallel to the data lines Dj and Dj+1. Storage capacitors $C_{sa}$ and $C_{sb}$ of the left column pixels are connected to the left power supplying line com1, and storage capacitors $C_{sa}$ and $C_{sb}$ of the right column pixels are connected to the right data line Dj+1. Second transistors $Q_b$ of an $i^{th}$ gate line Gi, that is, those second transistors corresponding to the upper row illustrated in FIG. 9, are connected to a relatively closer line among the power supplying lines com1 and com2, and second transistors $Q_b$ of an $i+1^{th}$ gate line Gi+1, that is, those second transistors corresponding to the lower row illustrated in FIG. 9, are connected to a relatively farther line among the power supplying lines com1 and com2. Accordingly, storage capacitors of the left column pixels are formed on portions where the power supplying line com1 and pixel electrodes overlap each other, e.g., where they are vertically aligned, and storage capacitors of the right column pixels are formed on portions where a data line and pixel electrodes overlap each other, e.g., where they are vertically aligned. An entire display region may be realized by repeating the above structure in a row direction and a column direction. A method of applying a driving voltage may be appropriately used according to the structure of the equivalent circuit. A method of manufacturing an exemplary embodiment of an LCD device will be understood by one of ordinary skill in the art based on the understanding of the structure.

According to the present invention, problems with displaying images related to a storage capacitor having an MIS structure can be prevented. As described above, the advantages of using a storage capacitor having the MIS structure include that an aperture ratio can be increased, mask costs can be reduced, and the number of process steps can be reduced. However, the disadvantages of a storage capacitor having an MIS structure often outweigh those advantages, such as since a channel layer is formed by simultaneously patterning a source, a drain, a data line, and a metal line, such as a power supplying line, there is a difference between the amount of accumulated electric charge when a data signal has a positive polarity and when a data signal has a negative polarity, thereby resulting in a change in a kick-back voltage for a pixel driving voltage and leading to an after image. However, according to the present invention, since a storage capacitor does not have an MIS structure, high-quality images can be obtained.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A liquid crystal display device comprising:
   a plurality of data lines disposed on a substrate;
   a plurality of gate lines disposed substantially perpendicular to the plurality of data lines, wherein the plurality of data lines and the plurality of gate lines together surround a plurality of pixel regions;
   a plurality of power supplying lines disposed substantially parallel to the plurality of data lines;
   a plurality of pixel electrode pairs, wherein each of the plurality of pixel electrode pairs comprises a first pixel electrode and a second pixel electrode respectively disposed in each pixel region of the plurality of pixel regions; and
   a pixel driving circuit comprising at least one transistor and a plurality of storage capacitors in each pixel region of the plurality of pixel regions,
   wherein the plurality of pixel electrode pairs have portions where the pixel electrode pairs and at least one of the plurality of data lines and the plurality of power supplying lines are vertically aligned with each other, and the plurality of storage capacitors are disposed at the vertically aligned portions.

2. The liquid crystal display device of claim 1, wherein the plurality of power supplying lines comprise a first power supplying line and a second power supplying line, both the first power supplying line and the second power supplying line extending substantially parallel to the plurality of data lines,
   wherein the first pixel electrode and the second pixel electrode intersect the first power supplying line and the second power supplying line,
   wherein the plurality of storage capacitors are formed between the first pixel electrode and second pixel electrode and the first power supplying line and the second power supplying line.

3. The liquid crystal display device of claim 2, wherein the first pixel electrode and the second pixel electrode and the first power supplying line and the second power supplying line comprise extensions facing each other at the intersections between the first pixel electrode and the second pixel electrode and the first power supplying line and the second power supplying line.

4. The liquid crystal display device of claim 2, wherein the first pixel electrode and the second pixel electrode are substantially symmetrical with one another about the first power supplying line and the second power supplying line.

5. The liquid crystal display device of claim 4, wherein the first pixel electrode and the second pixel electrode are interdigitated with one another.

6. The liquid crystal display device of claim 1, wherein one of the plurality of power supplying lines and one of the plurality of data lines are disposed at opposing sides of each of the plurality of pixel regions.

7. The liquid crystal display device of claim 6, wherein the first pixel electrode and the second pixel electrode have extensions that are vertically aligned with at least one of a power supplying line of the plurality of power supplying lines and a data line of the plurality of data lines.

8. The liquid crystal display device of claim 6, wherein at least a portion of the plurality of storage capacitors are disposed at regions where the first pixel electrode and the second pixel electrode are vertically aligned with the plurality of power supplying lines, and the remaining storage capacitors are disposed at regions where the first pixel electrode and the second pixel electrode are vertically aligned with the plurality of data lines.

9. The liquid crystal display device of claim 1, wherein the plurality of power supplying lines and the plurality of data lines include the same material as a drain electrode and a source electrode of the transistor.

10. The liquid crystal display device of claim 9, wherein the transistor has a bottom gate structure in which a gate electrode is disposed under a channel layer, wherein a dielectric layer included in each of the plurality of storage capacitors includes a dielectric material disposed on the transistor.

11. The liquid crystal display device of claim 10, wherein a planarization layer comprising the dielectric material is disposed on the transistor, and the dielectric layer is integrally formed as a single, unitary and indivisible component with the planarization layer.

12. The liquid crystal display device of claim 1, wherein the transistor has a bottom gate structure in which a gate electrode is disposed under a channel layer, wherein a dielectric layer included in each of the plurality of storage capacitors includes a dielectric material disposed on the transistor.

13. The liquid crystal display device of claim 10, wherein a planarization layer comprising the dielectric material is disposed on the transistor, and the dielectric layer is integrally formed as a single, unitary and indivisible component with the planarization layer.

14. A method of manufacturing a liquid crystal display device comprises:

disposing a plurality of data lines disposed on a substrate;

disposing a plurality of gate lines substantially perpendicular to the plurality of data lines, wherein the plurality of data lines and the plurality of gate lines together surround a plurality of pixel regions;

disposing a plurality of power supplying lines substantially parallel to the plurality of data lines;

disposing a plurality of pixel electrode pairs in each pixel region of the plurality of pixel regions, wherein each of the plurality of pixel electrode pairs comprises a first pixel electrode and a second pixel electrode; and providing a pixel driving circuit comprising a transistor and a plurality of storage capacitors in each pixel region of the plurality of pixel regions, wherein the plurality of pixel electrode pairs include portions where the pixel electrode pairs and at least one of the plurality of data lines and the plurality of power supplying lines are vertically aligned with each other, and the plurality of storage capacitors are disposed at the vertically aligned portions.

* * * * *